(12) United States Patent  (10) Patent No.: US 7,486,297 B2
Kouramanis et al.  (45) Date of Patent: Feb. 3, 2009

(54) METHOD AND APPARATUS FOR IMAGE PROCESSING IN A HANDHELD DEVICE

(75) Inventors: Ioannis Kouramanis, East York (CA); Maxim Smirnov, Brampton (CA); Milivoje Aleksic, Richmond Hill (CA)

(73) Assignee: ATI Technologies, Inc., Markham, Ontario (CA)

( * ) Notice: Subject to any disclaimer, the term of this patent is extended or adjusted under 35 U.S.C. 154(b) by 822 days.

(21) Appl. No.: 10/667,912

(22) Filed: Sep. 22, 2003

(65) Prior Publication Data

US 2005/0062858 A1  Mar. 24, 2005

(51) Int. Cl.
 *G06T 15/00* (2006.01)
(52) U.S. Cl. .................. 345/536; 345/538; 382/248; 382/262; 348/281
(58) Field of Classification Search ......... 345/536–540, 345/419; 382/248, 282, 262; 348/281.3, 348/281
See application file for complete search history.

(56) References Cited

U.S. PATENT DOCUMENTS

| | | | |
|---|---|---|---|
| 4,716,460 A | 12/1987 | Hancock et al. ............. | 358/140 |
| 6,118,818 A | 9/2000 | Min et al. ................... | 375/240 |
| 6,175,662 B1 * | 1/2001 | Toda .......................... | 382/282 |
| 7,103,702 B2 * | 9/2006 | Funamoto ................... | 710/307 |
| 7,113,302 B2 * | 9/2006 | Reddy et al. ................ | 358/1.15 |
| 7,184,604 B2 * | 2/2007 | Mizuno et al. .............. | 382/248 |
| 7,196,802 B2 * | 3/2007 | Tsuchiya .................... | 358/1.1 |

FOREIGN PATENT DOCUMENTS

EP  0 655 723 A  5/1995

OTHER PUBLICATIONS

International Search Report for International Application No. PCT/IB2004/003064 dated Dec. 22, 2004.

* cited by examiner

*Primary Examiner*—Phu K Nguyen
(74) *Attorney, Agent, or Firm*—Vedder Price P.C.

(57) ABSTRACT

The present invention provides a method and apparatus for image processing using a graphics processor in a handheld device including a first memory device receiving a video input signal containing encoded video frame having a plurality of portions of encoded video frame data. The first memory device has a storage capacity less than all of the plurality portions of the encoded video frame data. The method and apparatus further includes the graphics processor coupled to the first memory device, wherein the graphics processor receives the first portion of the encoded video frame data and generates a first graphics portion. A second memory device receives the first graphics portion and stores the first graphics portion therein. As such, the encoded video frame is processed on a portion-by-portion basis using the first memory device and the second memory device in conjunction with the graphics processor.

37 Claims, 6 Drawing Sheets

9D

METHOD AND APPARATUS FOR IMAGE PROCESSING IN A HANDHELD DEVICE

FIELD OF THE INVENTION

The present invention relates generally to handheld devices and more specifically to graphics rendering within a handheld device.

BACKGROUND OF THE INVENTION

With the growth of modem computing trends, there is an increased demand in portability and improved functionality in a handheld device, wherein a handheld device may be, but not limited to, a cellular phone, a personal digital assistant (PDA), a pager, a smart phone, or any other suitable portable electronic device capable of providing graphical interactivity, as recognized by one having ordinary skill in the art. Furthermore, with the convergence of handheld devices and stand alone computing systems, such as desktop or laptop computers, there is a greater demand for improved functionality and quality of interactivity between multiple handheld devices and also between the handheld device and the stand alone computing system.

An emerging area in handheld devices is the ability to acquire, render and transmit graphical and/or video images. One example of convergence of multiple technologies is the placement of cameras on the handheld devices. With these graphic intensive applications, there exist prior art limitations with regards to graphical architecture for generating the graphical output. One common problem in the handheld device is the available memory resources. Current graphics rendering techniques, including three-dimensional graphics rendering techniques, require an extensive amount of memory in the performance of the various rendering steps in an image-processing pipeline.

Furthermore, graphic images may also be memory intensive due to compression techniques requiring a full stored image for the completion of a compression operation. In existing handheld devices, due to size requirements, there are limited of memory resources.

Another specific limitation found within current handheld devices is the limited physical real estate for placing graphics rendering engines and the limited real estate for placing memory. As handheld devices become more compact, there exists less real estate for the insertion of additional memory needed for image rendering. Therefore, problems arise in attempting to utilize existing graphics processors in handheld devices.

FIG. 1 illustrates a prior art handheld device 100 having a camera 102, a fixed size buffer 104, a JPEG processor 106 and a maximum decode size buffer 108. The camera 102 may be any suitably sized camera capable of capturing a video image 110 which is provided to the fixed sized buffer 104. In the handheld device 100, the fixed sized buffer 104 must be large enough to capture a single frame of the image 110 and is dependent on the size of the image 110 acquired by the camera 102, for example if the camera 102 acquires the image 110 with a resolution of 64 lines of 16 bits, the buffer 104 would contain enough memory locations to store the single image 110. Although, larger memory 104 may be utilized to provide for the ability of acquiring a streaming video or multiple images, as recognized by one having ordinary skill in the art.

In the typical handheld device 100, the image 110 is then displayed to the user in a thumbnail fashion, requiring a compression engine to construct a thumbnail of the image 110. In one embodiment, the JPEG processor 106 retrieves a stored image 112 and the stored image 112 is processed by the JPEG processor 106, in accordance with known JPEG processing techniques.

The JPEG processor 106 thereupon generates a decoded image 114, wherein the decoded image 114 is stored in the buffer 108. The size of the buffer 108 is fixed by the size of the decoded image 114. Therefore, the handheld device 100 must have 2 memory buffers 104 and 108, wherein the size of the memory buffers 104 and 108 are dictated by the camera 102 and the maximum decoded size of the image 114. The handheld device 100 requires either large memory buffers 104 and 108 or a reduction in the quality/resolution of the camera 102.

As such, there exists a need for a method and apparatus that overcomes the memory resource requirements within a handheld device and allows for quality image processing while maintain image acquisition technologies and image processing techniques.

BRIEF DESCRIPTION OF THE DRAWINGS

FIG. 8 illustrates a flowchart of a method for image processing in a handheld device; and FIGS. 9A-9E illustrate alternative embodiments of a method for image processing in a handheld device.

DETAILED DESCRIPTION OF A PREFERRED EMBODIMENT

Generally, the present invention provides a method and apparatus for image processing in a handheld device including a first memory device that receives a video input signal. In one embodiment, the first memory device is a dual buffer memory and the video input signal is an encoded representation of an image acquired using an image acquisition device, such as a camera. The video input signal contains an encoded video frame comprising a plurality of portions of encoded video frame data. The first memory device has a storage capacity less than all of the plurality of portions of encoded video frame data for the encoded video frame, such that the first memory device receives a first portion of the encoded video frame data.

The method and apparatus further include a graphics processor coupled to the first memory device, wherein the graphics processor receives the first portion of the encoded video frame data and generates a first graphics portion. The first graphics portion includes a decoded portion of the encoded video frame data. The method and apparatus includes a second memory device receiving the first graphics portion and storing the first graphics portion therein. As such, the encoded video frame is processed on a portion-by-portion basis using the first memory device and the second memory device, in conjunction with the graphics processor, such that limited memory resources may be utilized to produce a video frame.

Figure 1:
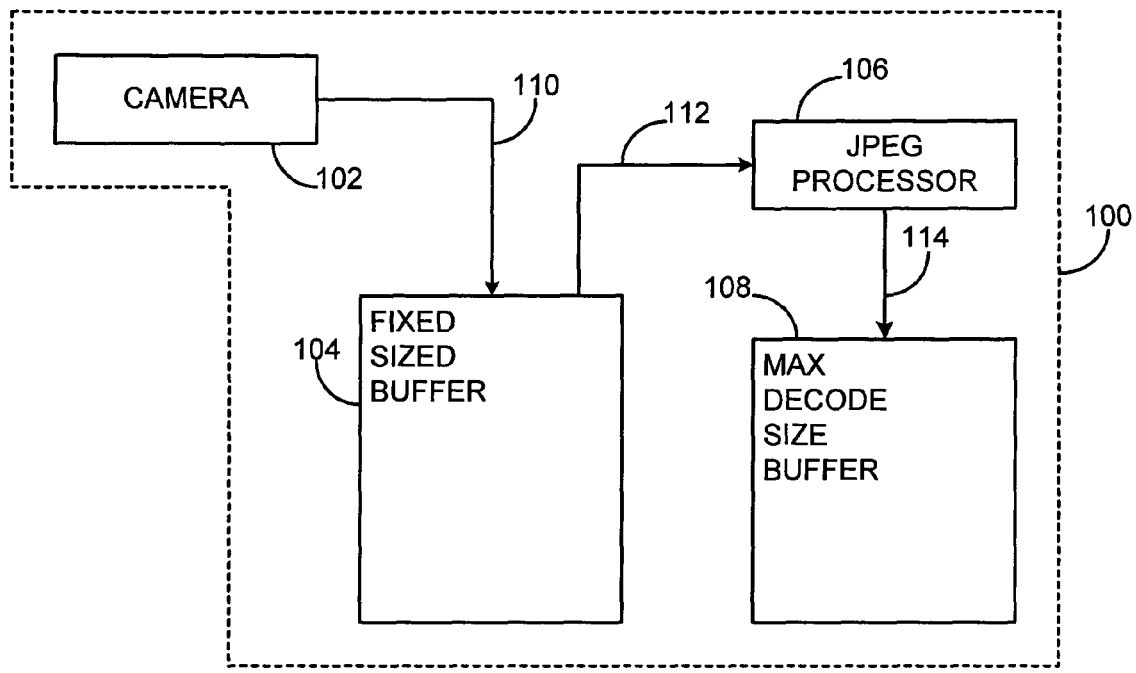
FIG. 1 illustrates a schematic block diagram of a prior art handheld device.
Figure 2:
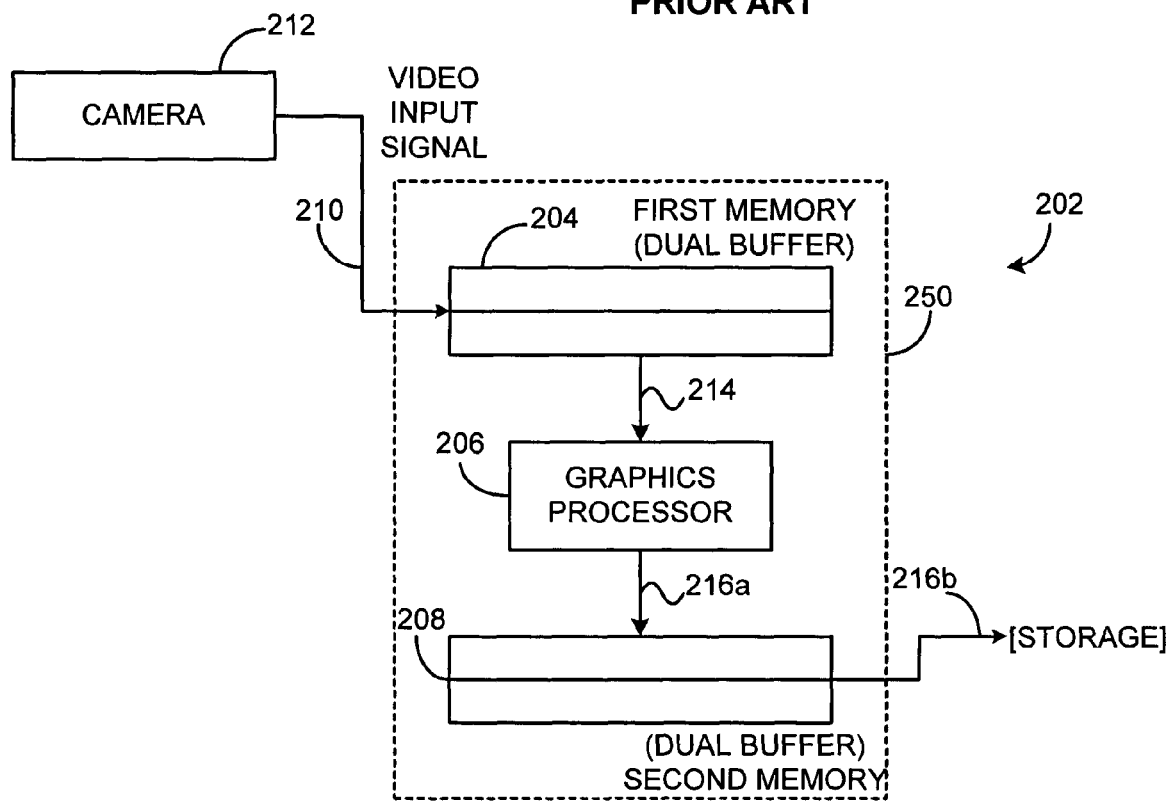
FIG. 2 illustrates a schematic block diagram of a handheld device in accordance with one embodiment of the present invention.

More specifically, FIG. 2 illustrates one embodiment of an apparatus 200 for image processing in a handheld device 202. The apparatus 200 includes a first memory 204, a graphics processor 206 and a second memory 208. In one embodiment, the first memory 204 and the second memory 208 are dual buffer memories capable of storing an encoded frame of video data.

The first memory device 204 and the second memory device 208 may be, but not limited to, a single memory, plurality of memory locations, shared memory, CD, DVD, ROM, RAM, EEPROM, optical storage, or any other non-volatile storage medium capable of storing digital data. Moreover, the processor 206 may be, but not limited to, a single processor, a plurality of processors, a DSP, a microprocessor, ASIC, state machine, or any other implementation capable of processing and executing software or discrete logic or any suitable combination of hardware, software and/or firmware. The processor should not be construed to refer exclusively to hardware capable of executing software, and may implicitly include DSP hardware, ROM for storing software, RAM, and any other volatile or non-volatile storage medium.

The first memory 204 receives a video input signal 210 from a camera 212. The video input signal 210 includes an encoded video frame having multiple portions of encoded video frame data. For example, the encoded video frame may be divided into sixteen portions, therefore the video input signal 210 is provided from the camera 212 in sixteen portions of encoded video frame data. In one embodiment, the portions represent a defined number of horizontal scan lines or any other suitable delineated field of pixels.

The first memory device 204 has a storage capacity less than all of the plurality of portions of encoded video frame data 210 for the encoded video frame, such in the exemplary embodiment described above being a dual buffer memory. A first portion 214 of the plurality of portions of encoded video frame data 210 is provided to the graphics processor 206. In one embodiment, the graphics processor 206 operates in accordance with known image processing techniques to generate a first graphics portion 216a, wherein the first graphics portion 216a is the decoded first portion of the encoded video frame data 214.

The first graphics portion 216a is thereupon provided to the second memory device 208. The second memory device 208 thereupon provides the first graphics portion 216b to a storage location, not illustrated, external to the apparatus 200. In one embodiment, the storage location, not illustrated, may be a frame buffer, wherein once all of the graphic portions of the plurality of encoded video frames are generated by the graphics processor 206, a full decoded video frame may be provided from a frame buffer, not illustrated, to a display, not illustrated.

Figure 3:
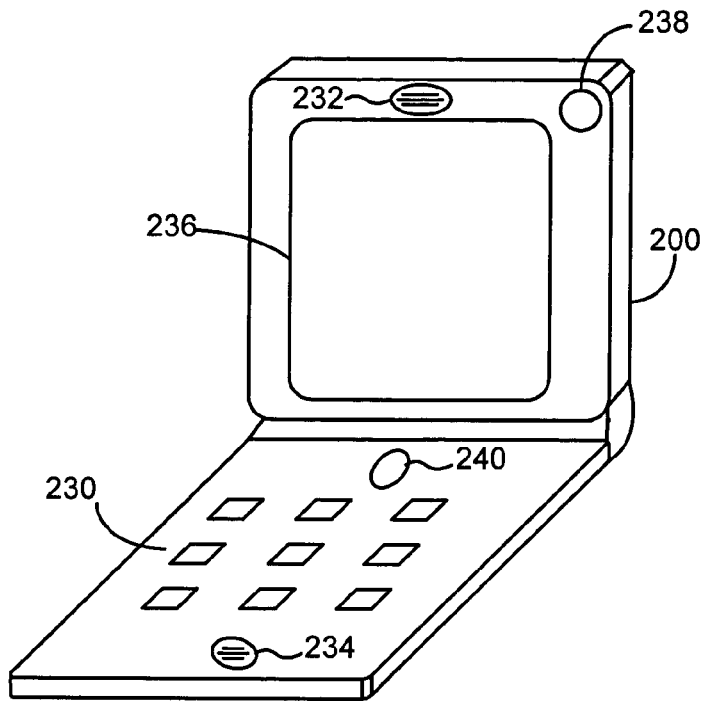
FIG. 3 illustrates a graphical representation of a handheld device, in accordance with another embodiment of the present invention.

FIG. 3 illustrates one embodiment of a handheld device 200, in accordance with one embodiment of the present invention. The handheld device 200 includes a keypad 230, a speaker 232, a microphone 234, a display 236, a camera 238 and a navigational button 240. As recognized by one having ordinary skill in the art, the handheld device 200 is for exemplary purposes only and the present invention may include any other suitable handheld device having the display 236 and the camera 238, with the processing elements illustrated in FIG. 2. In the handheld device 200 of FIG. 3, the camera 238 provides for video acquisition, whereas as recognized by one having ordinary skill in the art, the camera 238 may positioned at any other suitable location and/or more cameras may be disposed on the handheld device 200.

Figure 4:
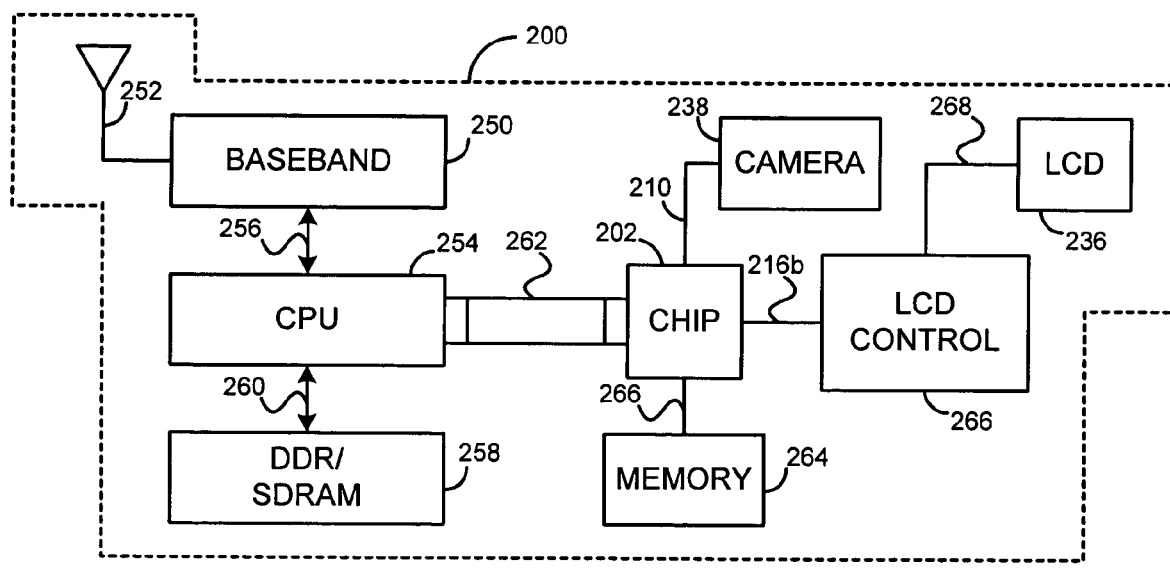
FIG. 4 illustrates a schematic block diagram of a handheld device in accordance with one embodiment of the present invention.

FIG. 4 illustrates a block diagram of the handheld device 200 including a baseband receiver 250 coupled to an antenna 252 for wireless communication therethrough. The baseband receiver 250 is operably coupled to a central processing unit (CPU) 254 for communicating communication information 256 therethrough. As recognized by one having ordinary skill in the art, the CPU 254 may be in accordance with known central processing units currently implemented and utilized within existing handheld devices.

In one embodiment, the CPU 254 may be coupled to an SDRAM/DDR 258 such that processing information 260 may be stored thereon and transferred between the memory 258 and the CPU 254. The CPU 254 is further coupled to the apparatus for image processing 202 across a flex cable 262.

One embodiment, the apparatus 202 is operably coupled to a memory 264, such as a secured digital memory card such that data 265 may be transferred therebetween. The handheld device 200 further includes the camera 238 providing the video input signal 210 to the apparatus 202, and the apparatus 202 is further coupled to an LCD controller 266. In one embodiment, the LCD controller 266 may include a frame buffer (not illustrated) disposed therein such that the first graphics portion 216b will be provided thereto. In accordance with known LCD controller operations, the LCD controller 266 thereupon provides a viewable output signal 268 to the LCD 236, or any other suitable display device as recognized by one having ordinary skill of the art.

Figure 5:
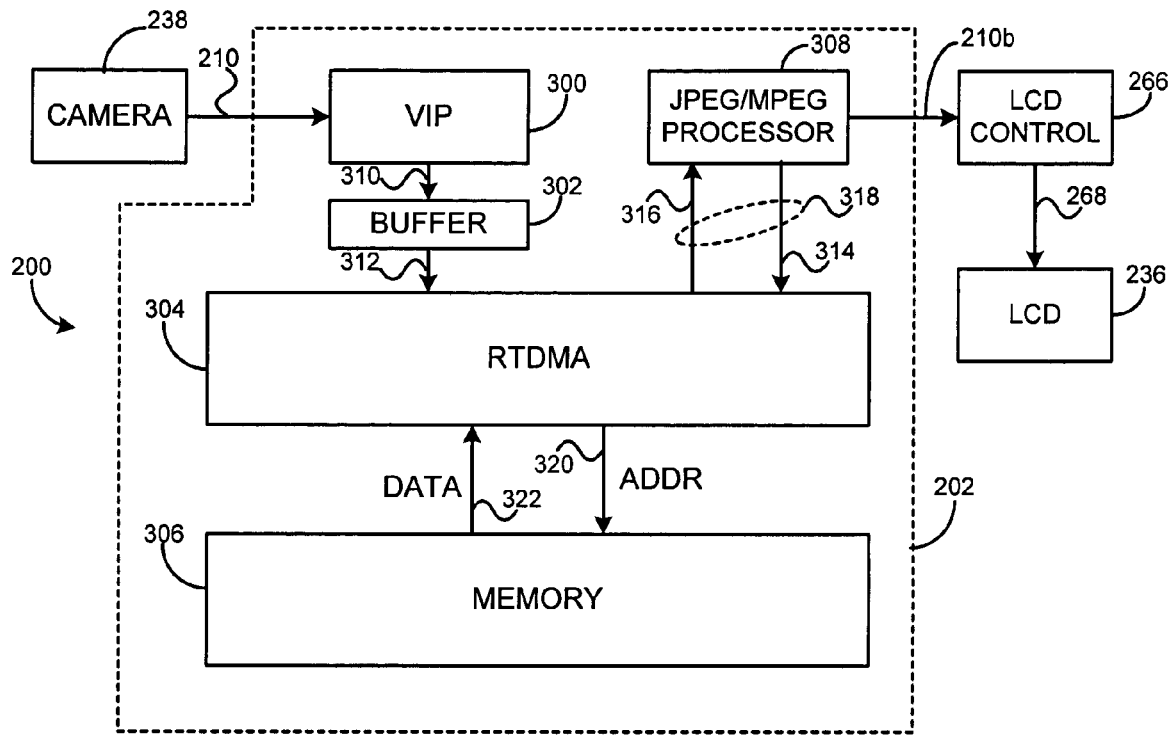
FIG. 5 illustrates another schematic block diagram of a handheld device in accordance with one embodiment of the present invention.

FIG. 5 illustrates another schematic block diagram of the handheld device 200, in accordance one embodiment of the present invention. The apparatus 202 includes a video input processor 300, a buffer 302, a real time direct memory access device (RTDMA) 304, a memory 306 and a JPEG/MPEG processor 308. As recognized by one having ordinary skill in the art, many elements that provide for operation within the apparatus 202 have been omitted for clarity purposes only.

The camera 238 provides the video input signal 210 including the encoded video frames to the video input processor 300. The video input processor 300 provides a video portion 310 to the buffer 302, whereupon the buffer 302 provides that buffer video portion 312 to the RTDMA 304.

The RTDMA 304, operating in conjunction with data request 314 and video information 316 across a bus 318 with the processor 308, the processor 308 renders the graphics information 312 provided from the buffer 302. One embodiment, the RTDMA 304 uses the memory 306, which may be any suitable type of memory as recognized by one having ordinary skill in the art, wherein in memory 306 as accessed in real time such that in response to an address 320, data 322 is retrieved.

The processor 308 is discussed further below with regards to FIG. 6. In response to the processing of the incoming video frame data, the processor decodes the plurality of portions of encoded frame data to generate video signals 216b provided to the LCD controller 266. In one embodiment, once the LCD controller 266 acquires a full frame, the full frame 268 is provided to the LCD 236. In another embodiment, if the LCD 236 is a progressive scan LCD display, the frame portions may be provided on a portion-by-portion basis instead of filling a frame buffer, not illustrated.

Figure 6:
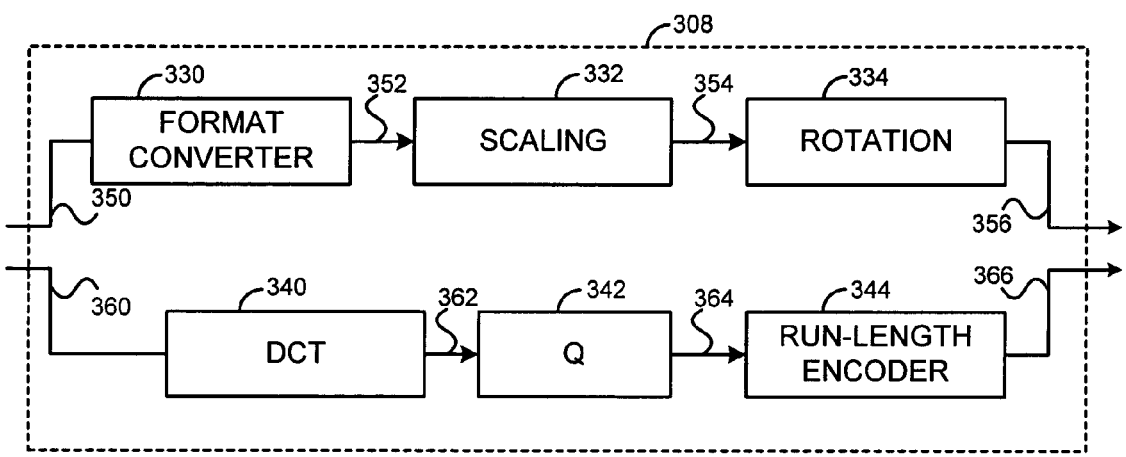
FIG. 6 illustrates a schematic block diagram of a portion a graphics rendering pipeline, in accordance with one embodiment of the present invention.
Figure 7:
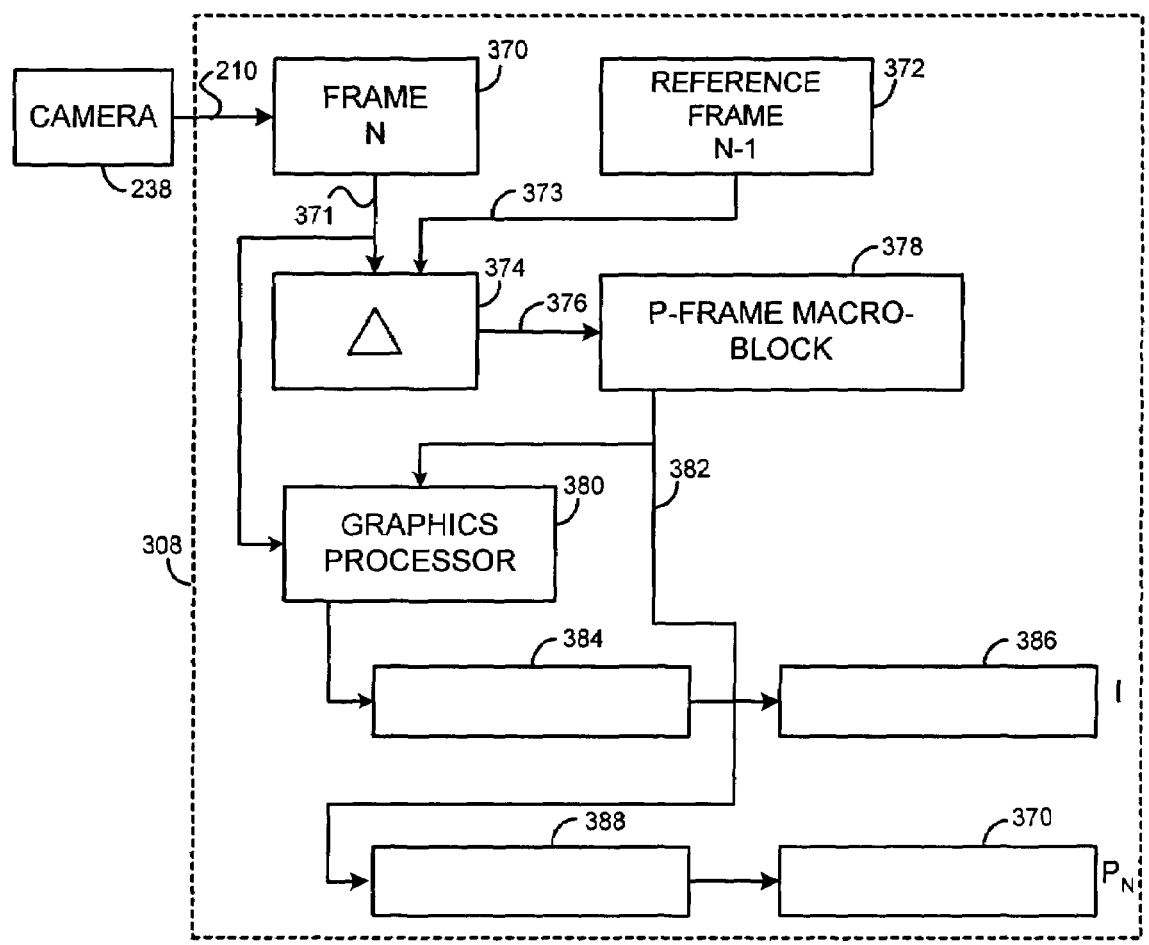
FIG. 7 illustrates a schematic block diagram of a portion a graphics rendering pipeline, in accordance with one embodiment of the present invention.

FIG. 6 illustrates a representation of functional block diagrams of elements equal to the embodiment of the decoded 308 illustrated in FIG. 5. The elements are more specifically directed towards an encoded video input signal. The processor 308 includes a format converter 330, a scaling module 332 and rotation module 334. In another data processing branch the processor 308 includes a discrete cosine transform (DCT) 340, a quantization module 342 and a run-length encoder 344. The functional block elements within the processor 308 may be hardware, software or combination thereof. In one embodiment, the blocks are represented by a processor executing executable instructions for performing the specific operations associated therewith.

In one embodiment, the blocks within the processor 308 represent a branch process, wherein specific operations are performed relative to the selected branch operation. For example, the blocks 340, 342 and 344 may be within a central processing unit branch operation, wherein the blocks 330, 332 and 334 are within a graphics-processing branch. Moreover, the scaling operations in 332 may be performed with or without format conversion with the format converter 330, based on a formatting specification.

In one embodiment, an input signal 350 is provided to the format converter 330 which generates a format converted signal 352. The format converted signal 352 is provided to the scaling block 332 such that a scaled data signal 354 is provided to a rotation block 334. Based on the rotation value, the orientation of the image represented by the signal 354 may be thereupon rotated to generate a rotated output signal 356.

In another embodiment, an input signal 360 may be provided to the DCT functional block 340 such that a transformed signal 362 is provided for the quantinization block 342. Using, in one embodiment, a quantinization table, not illustrated, the signal 362 may be adjusted quantinization, to generate an adjusted output signal 364. The adjusted output signal 364 is provided to the run-length encoder 344 to augment ending code the run length of the signal 364, thereupon generating the output signal 366.

Based on the selection of the particular branch, output signal 356 or output signal 366 include decoded portion of encoded video data such that on a portion by portion basis, a full frame of video data may be generated, wherein that full frame may include scaled and/or rotated image data.

In one embodiment, the quantinization table may be used to produce an output commensurate with the buffer size, wherein the hardware dynamically adjusts the quantinization table.

Figures 8, 9A:
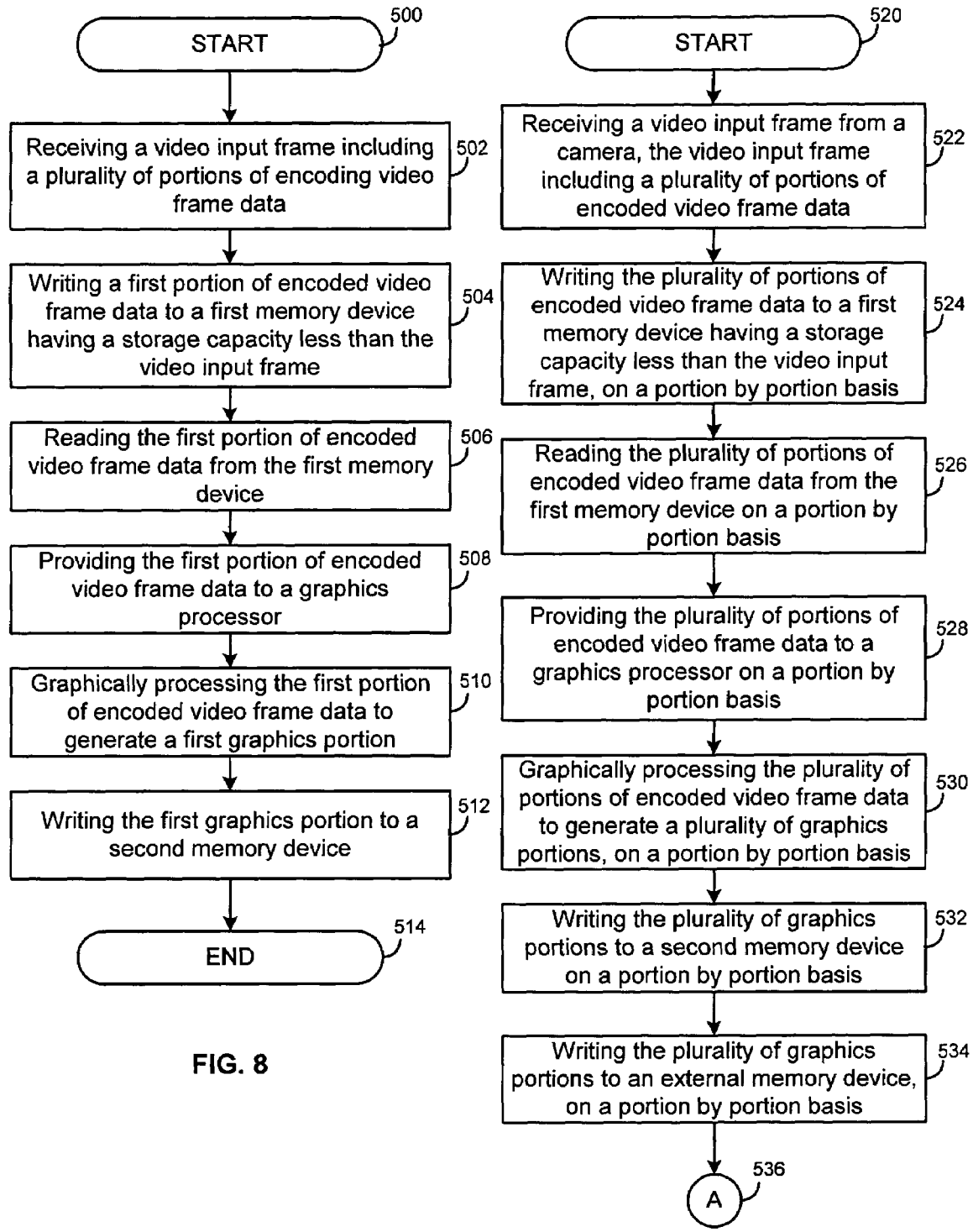

FIG. 8 illustrates an MPEG processing portion of the graphic processor 308 receiving a streaming video input 210 from the camera 238, or in a streaming video input 210 includes a frame-by-frame input. Received in a first memory 370 is a first frame 371, designated frame one. Based on MPEG encoding techniques, a reference frame 373 retrieved from a memory location 372. Based on a delta calculation 374, the different frame 376 is written to a p-frame macro block memory 378.

The frame data 371 is further provided to a graphics processor 380. Graphics processor also receives a p-frame data 382 to generate the graphics output, in one embodiment the I-frame is written into a temporary buffer 384 and thereupon written to the I-frame macro block memory 386. Furthermore, the P-frame data 382 is written to a P-frame buffer 388 and thereupon written to a P sub-n macro-block 390.

Using well-known MPEG decoding techniques, the graphics processor 380 generates the associated frame data for generating an output display in the, in one embodiment, system illustrated in FIG. 5. Moreover, any other similar encoding with motion compensation or estimation capabilities, other than MPEG, as recognized by one having ordinary skill of the art, may be utilized.

FIG. 8 illustrates a method for image processing in a handheld device. The method begins, step 500, by receiving the video input frame including the plurality of portions of encoded video frame data, step 502. The next step is providing a first portion of encoded video frame data to a first memory device having a storage capacity less than the video input frame, step 504. As discussed above, in one embodiment the first memory 204 receives the plurality of portions of the encoding video frame data and has a storage capacity less than the video input frame.

The next step in the method includes reading the first portion of input video frame data from the first memory device, step 506. The next step, step 508, is providing the first portion of the encoded video frame data to graphics processor. Thereupon, the first portion of encoded video frame data is graphically processed to generate a first graphics portion, step 510. Thereupon, method includes writing the first graphics portion to a second memory device, step 512. Once again, with respect to FIG. 2, the first graphics portion 216a is written to the second memory 208 after being graphically processed by the processor 206. Thereupon, the method is complete step 514.

FIGS. 9a-9e illustrate multiple embodiments of a method for image processing in a handheld device. The embodiments provide for similar initial steps, but provide for a variety of alternative steps, illustrated relative to the steps of FIG. 9a relative to FIG. 9b-9e.

As illustrated in FIG. 9a, the method begins, step 520, by receiving a video input frame in a camera, the video input frame including a plurality of portions encoded of video frame data, step 522. In one embodiment, the camera 238, as illustrated in FIGS. 3 and 4, requires a video image and converts the video image into an input frame including a plurality of portions encoded video frame data. The next step, step 524, is writing a plurality of portions of encoded video frame data to a first memory device having a storage capacity less than the video input frame, on a portion-by-portion basis. Thereupon, the next step 526, is reading the plurality portions of the encoded video frame data from the first memory device on a portion-by-portion basis.

The method further includes providing a plurality of portions of encoded video frame data to a graphics processor on a portion-by-portion basis, step 528. As discussed above with regards to FIG. 2, the graphics processor 206 may receive the plurality of portions encoded video frame data 214 from the first memory 204. The next step, step 530, is graphically processing the plurality of portions of encoded video frame data to generate a plurality of graphics portions, on a portion-by-portion basis. In one embodiment, the graphics processor 206 and in another embodiment, the processor 308, performs this operation. Writing the plurality of graphics portions to a second memory device on a portion-by-portion basis is the next step, step 532. Thereupon, the method includes writing the plurality of graphic portions to an external memory device, on a portion-by-portion basis, step 534.

Figure 9B:
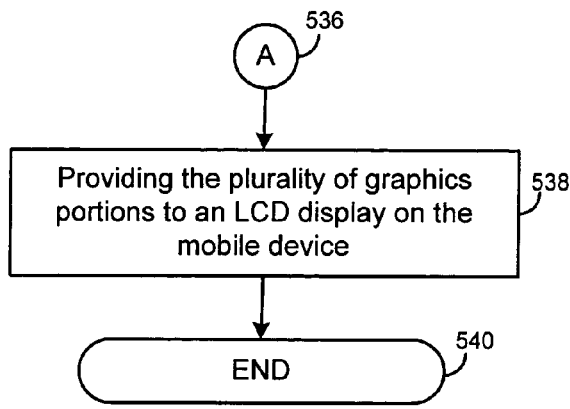

Thereupon, alternative embodiments may be performed relative to steps 522-534, indicator reference to indicator A, 536. In one alternative embodiment, FIG. 9b illustrates the step of providing a plurality of graphics portions to an LCD display on the mobile device, step 538. Thereupon, this embodiment is complete under step 540. The exemplary LCD display, as described above is, the display device 236 illustrated in FIG. 3 and FIG. 5.

Figure 9C:
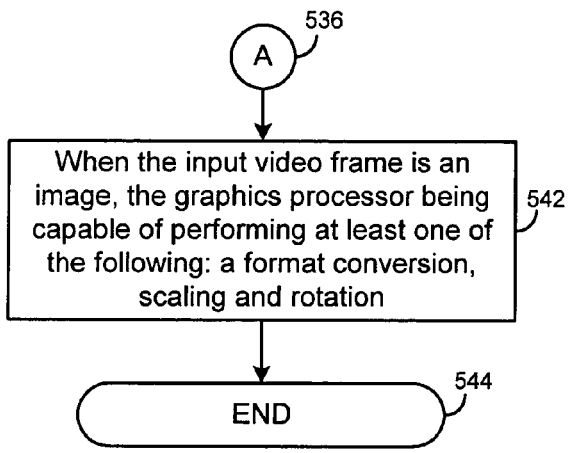

In an alternative embodiment continuing relative to marker A536, FIG. 9c illustrates the method includes the step of 542, when the input video frame is an image, the graphics processor being capable of performing a format conversion, scaling or a rotation, step 542. As discussed above, this embodiment may be performed within processor 308. Thereupon, this embodiment of the method is complete, step 544.

In another alternative embodiment indicate relative to marker A 556, FIG. 9*d* illustrates the next step, step 546, includes when receiving the input video frame is a single frame of a motion picture, the graphics processor being capable of performing a discrete cosine transform, quantinization or a vector run-length encoder. These operations are discussed above with regards to FIG. 6 with functional blocks 340, 342 and 344. The method further includes the quantinization table that may be utilized to adjust the plurality graphics portions to accommodate a storage capacity of the second memory portion, step 548. Thereupon, this method is complete, step 550.

Figure 9E:
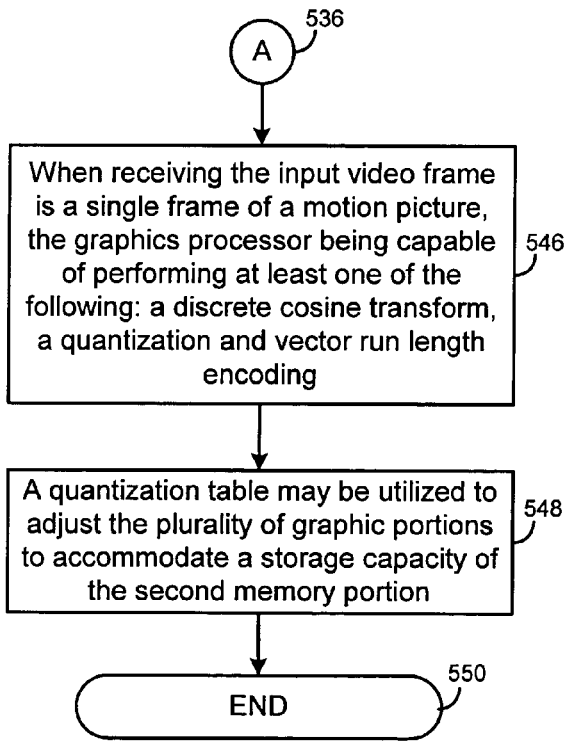
Figure 9E:
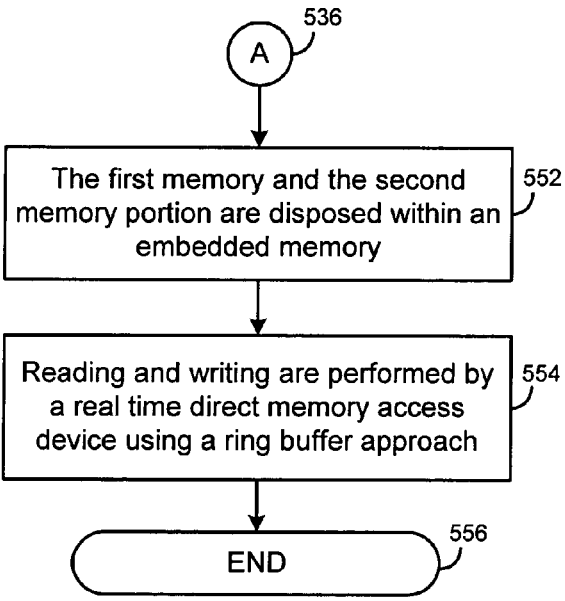

Another alternative embodiment illustrated with regard to FIG. 9*e* includes the steps of the method of FIG. 9*a* relative to marker A 536. The next step includes the first memory and the second memory portion disposed within an embedded memory, step 552. Thereupon, the reading of writing is performed by a real time direct memory access device using a ring buffer approach step 554.

The present invention input provides for an improved graphic processing within a handheld device by providing for the efficient utilization and processing of video data based on a portion by portion rendering technique. Through utilizing limited memory portions and processing the video input signal on an encoded video frame basis, a reduction in memory size requirements can be utilized and thereupon saving valuable real-estate within a handheld processing device.

It should be understood that the implementation of other variations and modifications of the invention in its various aspects would be apparent to those of ordinary skill in the art, and that the invention is not limited by the specific embodiments described herein. For example, the image processing may be performed using any encoding technique, above and beyond the disclosed MPEG and JPEG encoding technique for video data. It is therefore contemplated and covered by the present invention, any known modifications, variations or equivalents that fall within the spirit scope of the basic underlying principle is disclosed and claimed herein.

What is claimed is:

1. An apparatus for image processing in a handheld device, the apparatus comprising:
a first memory device that receives a video input signal from a camera, the video input signal containing an encoded video frame comprising a plurality of portions of encoded video frame data, the first memory device having a storage capacity less than all of the plurality of portions of encoded video frame data for the encoded video frame, the first memory device receiving a first portion of the encoded video frame data;
a graphics processor coupled to the first memory device such that the graphics processor receives the first portion of the encoded video frame data and generates a first graphics portion; and
a second memory device receiving the first graphics portion.

2. The apparatus of claim 1 further comprising:
an external memory device coupled to the second memory device such that the first graphics portion may be stored therein.

3. The apparatus of claim 2 wherein the first memory device receives all of the portions of the encoded video frame data and provides each of the portions of the encoded video frame data to the graphics processor on a portion-by-portion basis.

4. The apparatus of claim 3 wherein the graphics processor generates a plurality of graphics portions and provides the plurality of graphics portions to the second memory device on a portion-by-portion basis.

5. The apparatus of claim 4 wherein the second memory device provides the plurality of graphics portions to the external memory on a portion-by-portion basis.

6. The apparatus of claim 5 further comprising:
at least one display operably coupled to the external memory such that an output display may be provided from the external memory, wherein the output display includes the plurality of graphics portions.

7. The apparatus of claim 6 wherein the graphics processor further includes a quantization table for generating the graphics portions having an adjusted data set and wherein the output display is a thumbnail of the plurality of graphics portions.

8. An apparatus for image processing in a handheld device, the apparatus comprising:
a first memory device that receives a video input signal containing an encoded video frame comprising a plurality of portions of encoded video frame data, the first memory device having a storage capacity less than all of the plurality of portions of encoded video frame data for the encoded video frame, the first memory device receiving a first portion of the encoded video frame data;
a graphics processor coupled to the first memory device such that the graphics processor receives the first portion of the encoded video frame data and generates a first graphics portion;
a second memory device receiving the first graphics portion; and
a real time direct memory access device coupled to the first memory device and the second memory device and the graphics processor such that the real time direct memory access device provides for direct access to the first memory device and the second memory device.

9. The apparatus of claim 8 wherein the first memory device is a first portion of an embedded memory device and the second memory device is a second portion of the embedded memory device.

10. A method for image processing in a handheld device, the method comprising:
receiving a video input frame from a camera, the video input frame including a plurality of portions of encoded video frame data;
writing a first portion of encoded video frame data to a first memory device having a storage capacity less than the video input frame;
reading the first portion of encoded video frame data from the first memory device;
providing the first portion of encoded video frame data to a graphics processor;
graphically processing the first portion of encoded video frame data to generate a first graphics portion; and
writing the first graphics portion to a second memory device.

11. The method of claim 10 further comprising:
writing the plurality of portions of encoded video frame data to the first memory device on a portion-by-portion basis;
reading the plurality of portions of encoded video frame data from the first memory device on a portion-by-portion basis;
providing the plurality of portions of encoded video frame data to the graphics processor on a portion-by-portion basis;

graphically processing the plurality of portions of encoded video frame data to generate a plurality of graphics portions on a portion by portion basis; and writing the plurality of graphics portions to the second memory device, on a portion-by-portion basis.

12. The method of claim 11 further comprising:

writing the first graphics portion and the plurality of graphics portions to an external memory device, on a portion-by-portion basis.

13. The method of claim 12 further comprising:

providing the first graphics portions and the plurality of graphics portions to an LCD display on the handheld device.

14. The method of claim 11 wherein the step of graphically processing the plurality of portions of encoded video frame data includes at least one of following: format conversion, scaling, rotation, discrete cosine transformation, adjusting each one of the plurality of portions of encoded video frame data using a quantization table, format and run length encoding.

15. The method of claim 10 wherein the first memory portion and the second memory portion are dual buffers having an approximate storage capacity for storing two of the plurality of portions of encoded video frame data.

16. The method claim 10 wherein the first memory portion and the second memory portion are disposed within an embedded memory.

17. The method of claim 10 wherein the steps of reading and writing are performed by a real time direct memory access device using a ring buffer approach.

18. A handheld device comprising:

a camera capable of acquiring a video frame comprising a plurality of portions of encoded video frame data and generating a video input signal containing the plurality of portions of encoded video frame data;

a first memory device having a storage capacity less than all of the plurality of portions of encoded video frame data for the encoded video frame, the first memory device receiving a first portion of the encoded video frame data;

a real time direct memory access device coupled to the first memory device such that the real time direct memory access device writes the first portion of encoded video frame data to the first memory device;

a graphics processor operably coupled to the first memory device such that the graphics processor receives the first portion of the encoded video frame data through the real time direct memory access device and generates a first graphics portion; and a second memory device coupled to the real time direct memory access device wherein the second memory device receives the first graphics portion from the first graphics processor through the real time direct memory access device.

19. The handheld device of claim 18 wherein the graphics processor includes a quantization table capable of generating the first graphics portion in relation to a storage capacity of the second memory device.

20. The handheld device of claim 18 wherein the first memory device receives all of the portions of the encoded video frame data and provides each of the portions of the encoded video frame data to the graphics processor on a portion by portion basis, the graphics processor generates a plurality of graphics portions and provides the plurality of graphics portions to the second memory device on a portion by portion basis and the second memory device provides the plurality of graphics portions to an external memory on a portion by portion basis.

21. The handheld device of claim 20 further comprising:

at least one display operably coupled to the external memory such that an output display may be provided from the external memory, wherein the output display includes the plurality of graphics portions.

22. The handheld device of claim 20 wherein the graphics processor further includes an image decoder and a motion picture decoder.

23. The handheld device of claim 20 wherein when the camera acquires an image, the image decoder is capable of performing at least one of the following: a format conversion, scaling and rotating.

24. The handheld device of claim 23 wherein the image is a JPEG encoded image.

25. The handheld device of claim 23 wherein upon a scaling operation, the plurality of graphics portions represent a partial video frame.

26. The handheld device of claim 20 wherein when the camera acquires a motion picture, motion picture decoder is capable of performing at least one of the following: a discrete cosine transform, quantization, and vector run length encoding.

27. The handheld device of claim 26 wherein the motion picture decoder compares the portion of the encoded video display with a portion of a reference frame stored in a reference buffer to generate a potential frame.

28. The handheld device of claim 26 wherein the motion decoder is an MPEG decoder.

29. The handheld device of claim 18 wherein the real time direct memory access device uses a ring buffer approach.

30. A method for image processing in a handheld device, the method comprising:

receiving a video input frame from a camera, the video input frame including a plurality of portions of encoded video frame data;

writing the plurality of portions of encoded video frame data to a first memory device having a storage capacity less than the video input frame, on a portion-by-portion basis;

reading the plurality of portions of encoded video frame data from the first memory device on a portion-by-portion basis;

providing the plurality of portions of encoded video frame data to a graphics processor on a portion-by-portion basis;

graphically processing the plurality of portions of encoded video frame data to generate a plurality of graphics portions, on a portion by portion basis; and writing the plurality of graphics portions to a second memory device on a portion-by-portion basis.

31. The method of claim 30 further comprising:

writing the plurality of graphics portions to an external memory device, on a portion-by-portion basis.

32. The method of claim 31 further comprising:

providing the plurality of graphics portions to an LCD display on the handheld device.

33. The method of claim 31 further comprising:

when the input video frame is an image, the graphics processor being capable of performing at least one of the following: a format conversion, scaling and rotation.

34. The method of claim 31 further comprising:

when receiving the input video frame is a single frame of a motion picture, the graphics processor being capable of performing at least one of the following: a discrete cosine transform, a quantization and vector run length encoding.

35. The method of claim 34 wherein a quantization table may be utilized to adjust the plurality of graphic portions to accommodate a storage capacity of the second memory portion.

36. The method of claim 31 wherein the first memory portion and the second memory portion are disposed within an embedded memory.

37. The method of claim 36 wherein the steps of reading and writing are performed by a real time direct memory access device using a ring buffer approach.

\* \* \* \* \*